(12) United States Patent
Leuterer et al.

(10) Patent No.: US 7,153,463 B2
(45) Date of Patent: Dec. 26, 2006

(54) DEVICE FOR TREATING POWDER FOR A DEVICE WHICH PRODUCES A THREE-DIMENSIONAL OBJECT DEVICE FOR PRODUCING A THREE-DIMENSIONAL OBJECT AND METHOD FOR THE PRODUCTION THEREOF

(75) Inventors: Martin Leuterer, Olching (DE); Thomas Halder, München (DE)

(73) Assignee: EOS GmbH Electro Optical Systems, Munich (DE)

( * ) Notice: Subject to any disclaimer, the term of this patent is extended or adjusted under 35 U.S.C. 154(b) by 379 days.

(21) Appl. No.: 10/467,528

(22) PCT Filed: Jan. 30, 2002

(86) PCT No.: PCT/EP02/00960

§ 371 (c)(1),
(2), (4) Date: Aug. 7, 2003

(87) PCT Pub. No.: WO02/062560

PCT Pub. Date: Aug. 15, 2002

(65) Prior Publication Data

US 2005/0074550 A1   Apr. 7, 2005

(30) Foreign Application Priority Data

Feb. 7, 2001 (DE) .................... 101 05 504
Jan. 30, 2002 (EP) ................ PCT/EP02/00960

(51) Int. Cl.
*B29C 41/02* (2006.01)

(52) U.S. Cl. ..................... 264/308; 264/113
(58) Field of Classification Search ............... None
See application file for complete search history.

(56) References Cited

U.S. PATENT DOCUMENTS

| 3,386,182 A | 6/1968 | Lippert et al. |
| 3,995,771 A | 12/1976 | Olivier ................. 222/61 |
| 5,437,820 A * | 8/1995 | Brotz .................. 264/497 |
| 6,046,426 A | 4/2000 | Jeantette et al. ....... 219/121.63 |
| 6,401,001 B1 * | 6/2002 | Jang et al. ............ 700/118 |
| 6,932,935 B1 * | 8/2005 | Oberhofer et al. ....... 264/497 |

FOREIGN PATENT DOCUMENTS

| DE | 1 212 869 | 9/1966 |
| DE | 79 00 341 | 7/1979 |
| DE | 37 16 047 A1 | 12/1988 |
| DE | 195 30 296 A1 | 2/1997 |
| EP | 0 289 116 | 11/1988 |
| WO | WO 01/26846 A2 | 4/2001 |

* cited by examiner

*Primary Examiner*—Mary Lynn Theisen
(74) *Attorney, Agent, or Firm*—George W. Neuner; Edwards Angell Palmer & Dodge LLP

(57) ABSTRACT

A device for treating powder for a device for producing a three-dimensional object by means of a generative manufacturing process, in particular by means of laser sintering, is provided, having a supply container (1) for the powder with a base (2) and a side wall (3), characterised in that a chamber, which has a wall (4) which is permeable to a fluid medium towards the container interior, is provided in the container (1), and in that a device (9) for supplying a fluid medium into the chamber is provided.

10 Claims, 5 Drawing Sheets

DEVICE FOR TREATING POWDER FOR A DEVICE WHICH PRODUCES A THREE-DIMENSIONAL OBJECT DEVICE FOR PRODUCING A THREE-DIMENSIONAL OBJECT AND METHOD FOR THE PRODUCTION THEREOF

The invention relates to a device for treating powder for a device for producing a three-dimensional object, a device for producing a three-dimensional object and a process for producing a three-dimensional object.

Processes for producing three-dimensional objects, such as for example selective laser sintering or 3D printing are known, in which the three-dimensional object is formed layer-wise by solidifying a pulverulent material. In the technology of selective laser sintering, solidification is effected by means of a laser beam striking the powder layer, in 3D printing, a binder or adhesive is applied to the points of the powder layer to be solidified. The non-solidified powder is conventionally re-used as old powder and also mixed with new powder. Particularly in the case of selective laser sintering, during return of the old powder to the material circuit, there may be layering of the material from different sintering processes in an old powder container provided for the old powder. The different layers may differ in the powder properties, which leads to influences on the sintering process and the component quality. In addition, depending on the powder used, the properties of the old powder are not identical to those of the new powder, for example thermal ageing may occur when using thermoplastic powders. Furthermore, there may be stopping of the outflow of powder from the powder container.

A device and a process for producing a three-dimensional object is known from European application 0 289 116, in which the object is produced layer-wise by melting a powder material. The powder layers lying one above another are produced by means of a fluidised powder bed, wherein the powder is fluidised in the construction chamber in which the object is formed, so that in each case a new layer of powder is placed above a layer already solidified by melting.

It is the object of the invention to provide a device for treating powder for a device for producing a three-dimensional object, a device for producing a three-dimensional object and a process for producing a three-dimensional object, with which the problems described above are solved and the component quality as well as the efficiency of the construction process are improved.

The object is achieved by a device according to patent claim 1 or 8 and a process according to patent claim 12. Further developments of the invention are indicated in the sub-claims.

Further features and advantages of the invention can be seen from the description of exemplary embodiments using the figures.

Figure 1:
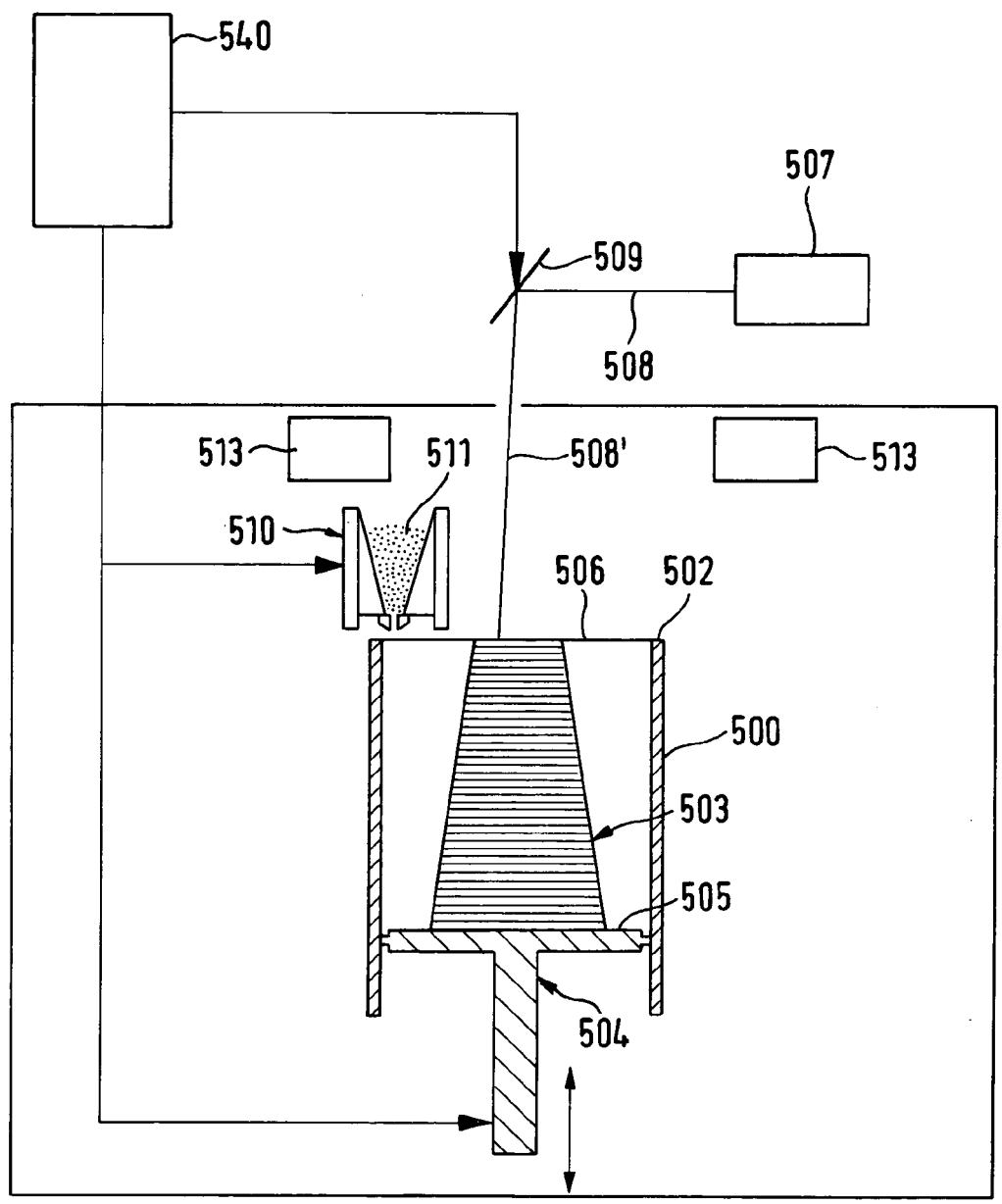
FIG. 1 shows a schematic representation of a laser-sintering device.

As can be seen particularly from FIG. 1, a laser-sintering device has a container or construction container 500 which is open at the top having an upper edge 502. The cross-section of the container 500 is greater than the largest cross-sectional area of an object 503 to be produced. A support 504 for supporting the object to be formed having an essentially flat surface 505 facing the upper edge 502 is provided in the container 500. The support 504 can be moved up and down in vertical direction in the container 500 by means of a drive indicated schematically in FIG. 1. The upper edge 502 of the container 500 defines a working plane 506.

An irradiating device in the form of a laser 507, which emits a directed light beam 508, is arranged above the working plane 506. A deflection device 509, for example as a system of galvanometer mirrors, is provided, by means of which the light beam 508 can be deflected as a deflected beam 508' to any required point of the working plane 506.

Furthermore, a coater 510 for applying a layer of a powder material 511 to be solidified to the support surface 505 or a layer solidified in the end is provided. The coater 510 can be moved back and forth over the working plane 506 by means of a schematically indicated drive from a first end position on one side of the container 500 into a second end position on the opposite side of the container 500. To fill the coater 511, in each case a filling container 513 for filling the coater with powder material is provided above the end positions of the coater 510.

Furthermore, a control device 540 is provided, by means of which the drive for setting the position of the support 504, the drive for moving the coater 510 and the drive for adjusting the deflecting device can be controlled in coordinated manner or independently of one another.

Figure 2:
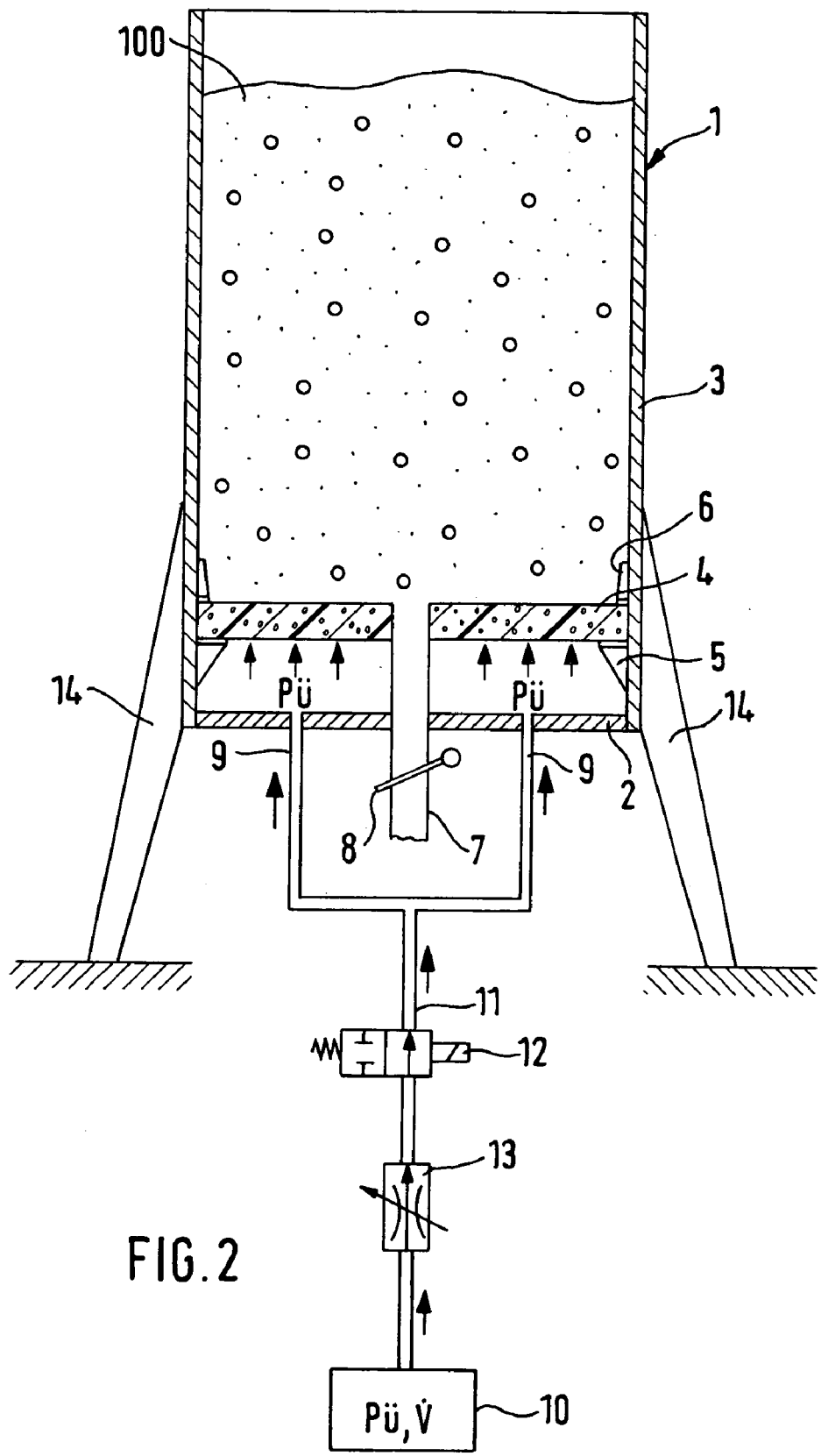
FIG. 2 shows a schematic cross-sectional view of the device of the invention for treating powder according to a first embodiment.

As can be seen from FIG. 2, the device of the invention for treating powder for a laser-sintering device in a first embodiment has a container 1 situated outside the actual laser-sintering device for receiving the old powder and/or a mixture of old and new powder. The container 1 has a base 2 and a wall 3 surrounding the base and extending vertically. The container 1 is open at its side opposite the base 2 to facilitate charging of powder.

A porous plate 4 arranged essentially parallel to the base 2, which has dimensions so that it extends over the entire cross-sectional area of the container interior, is provided at a distance from the base 2. The porous plate 4 sits on a, for example annularly running projection 5 provided on the container wall and is fixed to its side facing away from the base via a mounting 6. The porous plate 4 is preferably made from a plastic sintered plate and hence is gas permeable due to the porosity of the sintered material. The base 2 and the porous plate 4 have coaxial openings, through which a powder discharge pipe 7 is led out downwards. A closure flap 8 is arranged on the powder discharge pipe 7.

The base 2 of the container 1 has at least one, but preferably a plurality of supply pipes 9 for compressed air. The supply pipes 9 are connected to a compressed air source 10 via a common pipe 11. A multi-way valve 12 and an adjustable throttle valve 13 is arranged in the pipe 11 to control the supply of compressed air, in particular the pressure P and the volume flow V.

The whole container 1 is supported by standing feet 14.

In operation, old powder 100, which remains as non-sintered powder from sintering processes during selective laser sintering in a laser-sintering device, and/or a mixture of old and new powder is added to the container 1 until the latter is adequately filled. The powder 100 is situated in the region above the porous plate 4. Compressed air is then supplied via the compressed air source 10 and the pipes 11 and 9 into the chamber formed by the base 2, the side wall 3 and the porous plate 4 of the container 1 and the pressure and the volume flow is controlled in required manner via the valves. The porous plate 4 is permeable to the compressed air, so that the latter passes into the powder 100 and thoroughly mixes the latter. The powder 100 is fluidised by the laminar injection of air through the porous plate 4. Complete homogenisation and mixing of the old powder by turbulent fluidisation of the powder is achieved at a high quantity of air.

At a lower air flow, the powder is only diluted without being fluidised. In this state, no pouring cone can be formed above the powder discharge pipe 7 and stopping of powder flow is prevented. Hence, it is advantageous to work first of all at a high air flow in order to achieve complete mixing and then during discharge of the powder to set a low air flow so that the powder is discharged uniformly.

Figure 3:
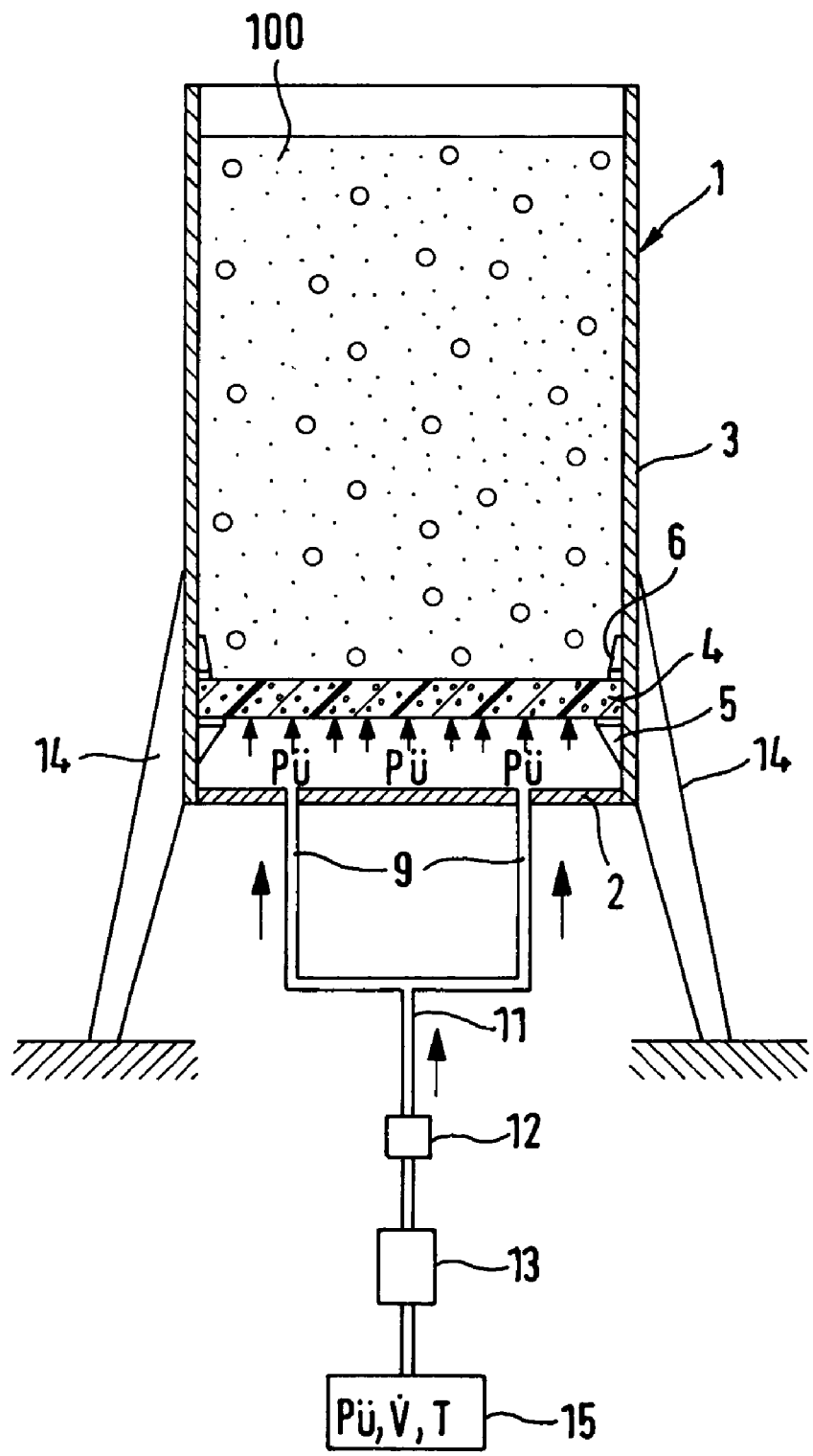
FIG. 3 shows a schematic view of a modification of the device of the invention from FIG. 2.

A discharge pipe 7 is not provided in a modification of the device shown in FIG. 3. Furthermore, a device 15 for supplying a cooling medium under excess pressure, for example likewise compressed air of a certain temperature, is provided, which serves for controlled and/or regulated cooling of the powder material 100 situated in the container 1. In a preferred design, the device 15 contains a temperature regulator, with which the cooling medium may be set at a certain temperature.

In operation, powder 100 is added to the container 1. The powder 100 is homogenised and optionally cooled in controlled manner by controlled supply of cooling medium. The powder is then poured out by, for example tipping the container, and returned to the laser-sintering device for a further construction process.

The gaseous medium supplied is not restricted to compressed air. A different gas may also be used, for example in order to achieve surface treatment of the old powder. Furthermore, the powder in the container may also be, for example moistened via the medium supplied or be subjected to a chemical treatment. The device is not restricted to the treatment of old powder. Mixed old powder and new powder may also be subjected to a treatment. Depending on expediency, a discharge pipe may also be provided in the container 1 of the modified embodiment shown in FIG. 3.

Figure 4:
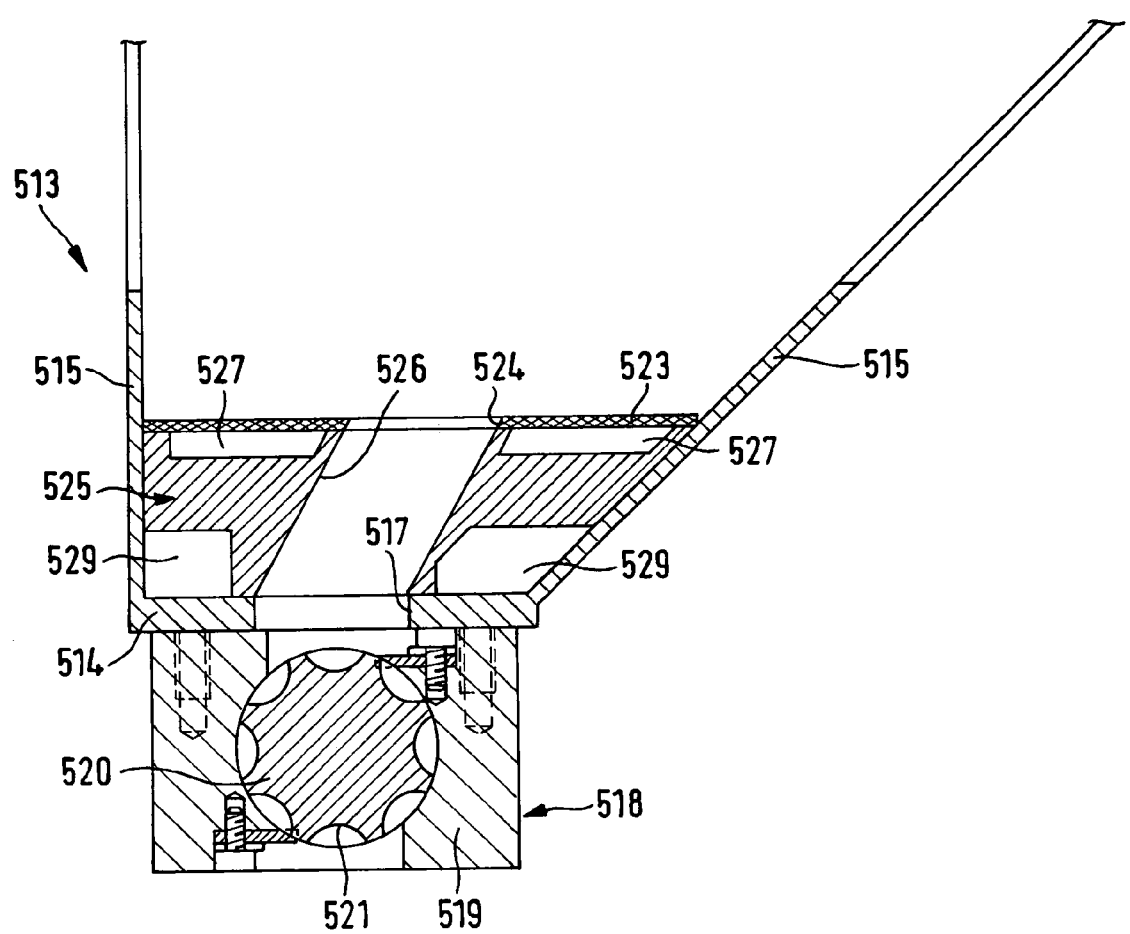
FIG. 4 shows a sectional view of a device of the invention for treating powder according to a second embodiment.
Figure 5:
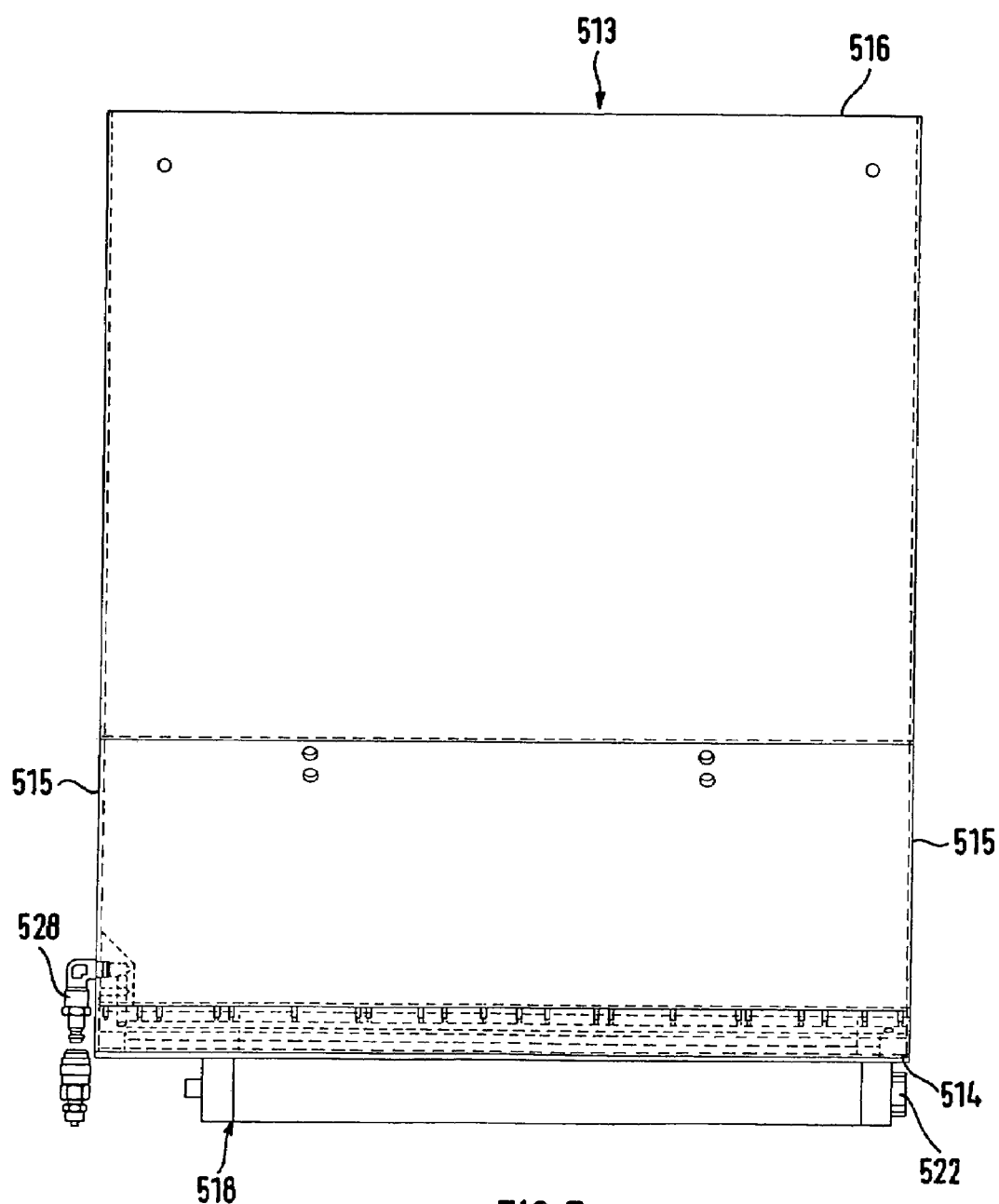
FIG. 5 shows a side view of the device from FIG. 4

In a further embodiment shown in FIGS. 4 and 5, the device of the invention for treating powder is provided within the laser-sintering device. Hence, at least one or even both of the filling containers 513 shown schematically in FIG. 1 has a device for fluidising the powder situated in the filling container. The filling container 513 is designed as a container extending over the entire construction field width, which container has a base 514 and side walls 515 extending from the latter. One of the side walls runs at an angle, as can be seen particularly from FIG. 4, so that the filling container has at its base a lower cross-section than at its upper open end 516. An outlet opening 517 extending essentially over the construction field width is provided on the base of the filling container. A metering device 518, which comprises a metering roller 520 attached in a housing 519, is provided on the side of the base 514 facing away from the container below the outlet opening 517. The metering roller 520 has a length which corresponds to the lengths of the coater 511. The metering roller 520 is designed so that it comprises on its surface a plurality of symmetrically arranged notches 521 which run in axial direction and which may accommodate a defined volume of powder. The metering roller 520 can be rotated via a drive 522 connected to a motor and shown in FIG. 5.

As can be seen particularly from FIG. 4, a porous wall or layer 523, which has an opening 524 corresponding to the outlet opening 517, is provided in the interior of the filling container 513 at a distance from its base 514. The porous, gas-permeable layer 523 is formed, for example from a rolled wire fabric. The porous layer 523 is held via a part 525 extending essentially over the entire construction field width, which part 525 rests on the base 514. The part 525 has a gap 526, the width of which corresponds to the outlet opening 517 in the base 514 of the filling container and which lies above this outlet opening. The opening 524 of the porous layer 523 corresponds to the gap 526. The part 525 is also designed so that it has recesses 527 extending below the porous layer, which form chambers and which are connected to a supply device 528 for a gaseous medium, for example for compressed air. The recesses 527 thus form the pressure chambers for fluidisation. Further recesses 529 of the part 525 facing the base 514 serve for accommodating attachment means, such as for example screws for the metering device 518.

In operation, the filling container is filled with powder. During the entire construction process or even at certain intervals, compressed air or a different required fluid medium is supplied to the chambers formed by the recesses 527. The powder situated in the filling container 513 is thus fluidised near the container base 514 and there is no powder build-up at the outlet opening 517. The peripheral-side notches 521 of the metering roller 519 are thus uniformly filled with powder. Filling of the coater 511 takes place in each case in the end position below the metering roller. By rotating the metering roller, the powder content of one or more notches is released into the coater. Fluidisation of the powder in the filling container facilitates very precise metering, which results in precise layer thickness and hence improved component quality.

In the process of the invention for producing the three-dimensional object by means of laser sintering, the powder is fluidised before the construction process in the container shown in FIGS. 2 and 3 and thus homogenised. It is then introduced into the laser-sintering device and used for the construction process which proceeds in known manner. Instead of or in addition to fluidisation before the entire construction process, the powder is fluidised in the filling container in the laser-sintering device.

The invention is not restricted to laser sintering, but can likewise be used for other generative processes for producing three-dimensional objects, in which powder is used.

The invention claimed is:

1. A process for producing a three-dimensional object by means of a generative manufacturing process, in which the object is built up by sequential application of layers of a powder material and solidification of the layers at points corresponding to the cross-section of the object, the process comprising fluidizing the powder in a supply container prior to solidification of a layer by supplying a fluid medium to the supply container to effect fluidization, the process further comprising the step of controlling and/or regulating at least one of a variant selected from the group consisting of a temperature, a pressure and a volume flow of the fluid medium.

2. The process according to claim 1, comprising fluidizing the powder before the entire construction process.

3. The process according to claim 1, comprising fluidizing the powder before application of a layer.

4. The process according to claim 1, wherein the fluid medium is a gas.

5. The process according to claim 1, further comprising controlling or regulating the temperature of the fluid medium.

6. The process according to claim 1, further comprising moistening the powder or chemically treating the powder via the supplying of fluid medium.

7. The process according to claim 1, further comprising providing a filling container connected upstream of a coater and fluidizing the powder in the filling container.

8. The process according to claim 7, further comprising metering the powder into the coater and fluidizing the powder before the metering step.

9. A process for producing a three-dimensional object by means of a generative manufacturing process, in which the object is built up by sequential application of layers of a powder material and solidification of the layers at points corresponding to the cross-section of the object, the process comprising fluidizing the powder in a supply container prior to solidification of a layer by supplying a fluid medium to the supply container to effect fluidization and controlling or regulating the temperature of the fluid medium.

10. A process for producing a three-dimensional object by means of a generative manufacturing process, in which the object is built up by sequential application of layers of a powder material and solidification of the layers at points corresponding to the cross-section of the object, the process comprising fluidizing the powder in a supply container prior to solidification of a layer by supplying a fluid medium to the supply container to effect fluidization and moistening the powder or chemically treating the powder via the supplying of fluid medium.

* * * * *